Patented Nov. 27, 1928.

1,693,118

UNITED STATES PATENT OFFICE.

WILLIAM B. NEWKIRK, OF RIVERSIDE, ILLINOIS, ASSIGNOR TO INTERNATIONAL PATENTS DEVELOPMENT COMPANY, OF WILMINGTON, DELAWARE, A CORPORATION OF DELAWARE.

HIGH-PURITY CRYSTALLINE DEXTROSE.

No Drawing. Application filed February 10, 1927. Serial No. 167,362.

My invention relates to the manufacture of crystalline dextrose from starch converted dextrose solutions, and more particularly, to the production of granular dextrose of very high purity; and the object of the invention is the production of dextrose having certain improved physical characteristics, in comparison with the dextrose sugars heretofore made, namely, increased purity, whiteness, luster, greater uniformity in size and shape of the granules, making the product more free running, and of increased sweetness, and diminished hygroscopicity.

The invention seeks to improve upon the products claimed in United States patents granted to applicant No. 1,508,569, September 16, 1924 for grape sugar; No. 1,521,829, January 26, 1925, anhydrous grape sugar, and No. 1,559,176, October 27, 1925, dextrose hydrate. These patents disclose methods for producing anhydrous as well as hydrate dextrose, but while the anhydrous product has been made to some extent in accordance with these methods, because of certain difficulties in the manufacture of this crystal type, the output of the anhydrous product has been relatively small, while the hydrate product is now being manufactured at the rate of several million pounds per month. In certain respects and for certain purposes, however, the anhydrous product is superior to the hydrate, and the present invention is more especially concerned with the production of a high purity granular anhydrous dextrose.

Patent No. 1,508,569 covers specifically a granular hydrate dextrose consisting of separate unitary crystals, which, however, as the patent implies, are not necessarily individual crystals, although many of them will be, but are chunky and hard and unitary in their structure, and in the form of separate granules, in distinction to being flakes or needles or groups or conglomerations of interlaced or intergrown crystals. The sugar produced according to the improved methods of my present invention may also contain crystals which are twins or aggregates of the unitary character referred to in the patent last mentioned, but it will contain less of this type of crystals and a much larger percentage of individual crystals in the strict sense of the term. The manufacture may be carried out so that 90% of the batch will be true individuals and only 10% twins and parallel growth aggregates. As a result of this, and of the greater uniformity of size, the product has a more brilliant luster and whiteness, and will run more freely, since the surfaces are smoother and the geometrical forms more regular as to size and shape. For the same reasons the crystals will purge more readily in the centrifugal machine, and will be washed clean more easily, insuring the higher purity, and hence greater sweetness, and without erosion of the crystals, which affects their luster.

In the patents above referred to, it has been disclosed that to produce a purgible magma, the crystals must be substantially all of the same crystal type, as well as being of "normal form", that is, having substantial dimensions on three axes in distinction to crystals of a needle-like or flake-like kind, which have substantial dimensions only along one or along two axes. This principle has been amply verified by experience. It has been found in carrying out these processes that if the temperature of the solution, the quality and character of the impurities, and the crystal type of the solid phase in the solution, are such, for example, as to produce in the crystallized magma (mother liquor and crystals), a mixture of anhydrous crystals with some, even a small quantity of hydrate crystals, that is if the conditions do not definitely and positively favor an unbalanced state in the solution toward the anhydride, not only will the hydrate ordinarily be in the form of flakes and needles, and so break down in the centrifugal machine, but the hydrate crystals will have a dissolving influence on the anhydrous crystals, which in itself tends to make the mass unpurgible. Apparently a mixture of anhydrous and hydrate crystals in the presence of mother liquor tends to return to a state of solution and recrystallizes as hydrate of the pseudomorphic type.

It has been the general practice for many years in the cane sugar industry to crystallize or "grain" in the vacuum pan in which the liquor is concentrated or "boiled". This practice has not been considered adaptable to the crystallization of dextrose from a starch converted solution because of the apparent impossibility of producing by this method a magma of crystals and mother liquor from which the mother liquor could be extracted completely. The efforts to crystallize dextrose ever since the discovery of Kirchoff in 1812 have, generally speaking, followed quite different lines of procedure. Sucrose procedure involves maintaining supersaturation by extraction of water. In the crystallization of dextrose the usual practice has been to maintain supersaturation by lowering temperatures.

I have discovered, however, that if certain facts, which have not heretofore been fully recognized, or the bearing of which on this subject has not been clearly understood, are taken into consideration a dextrose solution of proper character may be successfully "grained in the pan". The sucrose practice must be modified, however, in certain important respects because of the wholly different character of reactions which take place when dextrose and sucrose solutions are supersaturated. The crystallization of dextrose is to a very marked extent exothermic, while the crystallization of sucrose is so slightly exothermic that this factor need not be and has not been considered in practice. In a dextrose solution, there are, it is believed, five isomeric forms of dextrose, namely: alpha anhydrous, alpha hydrate, the specific rotation of both of which is 120° plus; beta anhydrous and beta hydrate, the specific rotation of which is from 16° plus to 20° plus (C. S. Hudson says 19° plus) and a dextrose heretofore known as theta which is, apparently, a transition product between the alpha and beta forms. The alpha hydrate and anhydrous, the common commercial dextroses, and the beta anhydrous are the only forms, so far as I know, which can be crystallized.

These five isomerides (there may be more) when in solution tend to reach an equilibrium, whether the solution consists originally of one form or all forms in varying quantities, and the equilibrium mixture has a specific rotation of 52° plus. One form, when in excess, changes into the other forms, the process being reversible and depending upon the quantitative relations between the different forms. The phenomenon is due to mass action and may be described as tautomerism. The change is from the alpha anhydrous, through the alpha hydrate, to the transition form and then through the beta hydrate, to the beta anhydrous, or in the reverse order from beta anhydrous to alpha anhydrous. That is to say transition from one anhydrous form to the other involves adding water to and then eliminating it from the molecule. The crystallized alpha hydrate has pseudo-morphic forms, of small or flake-like or blade-like structure, as well as the tablet form of crystals which may be considered normal. The pseudo-morphic forms must be excluded if the magma is to be purgible since they break down under the forces developed in the centrifugal machine. The alpha anhydrous normally crystallizes as well developed prisms but with a tendency under certain conditions to twinning and parallel growth. By "parallel growth" I mean the growth of one crystal on the face of another. This tendency must be prevented or limited in order to obtain a product having the most desirable characteristics. The beta anhydrous tends to crystallize as prisms somewhat like the alpha anhydrous but slightly more elongated. It also has a tendency to form twins and parallel growths, and to crystallize in forms which, though chunky enough to purge, are deficient in their facial development so that they lack some of the brilliancy of the normal crystals. Crystallization takes place, on supersaturation, in one crystal type exclusively, when the solution is strongly unbalanced in favor of that type, but if conditions are not distinctly favorable to one type throughout the crystallizing operation the other crystallizable types may be produced. That is, if the solution, for example, is first unbalanced toward the alpha anhydrous and then toward the alpha hydrate, as may occur because of too rapid a lowering of temperature from the anhydrous into the hydrate range both types of crystals will be formed, and, for the reasons stated, the massecuite will not be purgible, or at least completely purgible. The factors bringing about disturbance in equilibrium as between the different dextrose forms in the solution,—these forms involving change in molecular structure, no doubt—are several, and such factors under ordinary conditions will not remain constant throughout the crystallizing operation. Thus the removal by crystallization of dextrose of one form from solution not only changes the balance between the solid and the liquid phase but disturbs the equilibrium as between the different dextrose isomerides in the mother liquor and also the proportion as between impurities and dextrose in solution. The effect of crystallization on all of these changes must be taken into consideration. For instance, the presence in the solution of solid phase of one type, will unbalance the solution in the direction favorable to the formation of crystals of that particular type. Supersaturation at relatively high temperatures favors crystallization as alpha or beta anhydrous, the beta crystallizing out first at the higher temperature. Supersaturation at low temperatures favors crystallization as alpha hydrate. The quantity and character of the impurities also affects the type of crystals produced, an impure solution tending to bring about crystallization as hydrate. The viscosity of the solution, while not directly affecting crystal type, does so indirectly since it slows down the crystallizing action, and is itself a variable factor, both initially in the converted solution and also as the solution is depleted of its dissolved dextrose. Its influence will be different at one stage of the crystallizing operation than at another.

The difficulties attending the maintenance of conditions favorable to the production of one crystal type to the substantial exclusion of others—this being necessary, as stated, for obtaining a completely purgible magma, and a growth of crystals having the desired characteristics—are due, therefore, to factors not present in the crystallization of cane or beet sugar, namely: the exothermic character of the reaction; the fact that the dextrose solution is a mixture of isomerides (E. F. Armstrong "Carbohydrates and Glucosides" 4th edition, page 121) which tend to crystallize under specifically different conditions; and the influence of the impurities which in an ordinary starch converted solution are present in relatively large quantities and are of a highly complex and variable character.

I have found, however, that it is possible, in spite of the settled belief to the contrary as evidenced by a voluminous literature on the subject, to manufacture crystalline dextrose on a commercial scale by a method of graining in the pan, that is by the method of maintaining supersaturation by extraction of moisture without substantial change in temperature; and that furthermore the product so made will have characteristics which make it superior to crystalline dextroses heretofore produced by the methods disclosed in the patents referred to which involve maintaining supersaturation solely by decrease of temperature. This new method, as applied to the manufacture of the anhydrides, alpha and beta, and also of the alpha hydrate will now be described.

*Production of the anhydrides.*

Preferably a solution is used having a higher purity than that of the ordinary starch converted dextrose solution, which contains about 89% to 90% dextrose on the basis of dry substances. However, lower purity solutions can be used but this will necessitate increased care and supervision in the operation of the process. I have found that a sugar having all of the desired characteristics above noted can be obtained readily from a solution of 94% purity. This may be had by crystallizing according to the method of Patents 1,471,347 or 1,521,830, but since 100% purity is not aimed at, less care need be taken in crystallizing and the purged massecuite will not have to be washed with water. The sugar produced in this manner, or in any other suitable manner, is melted with water and introduced, with or without filtration, into a vacuum pan at any suitable density, say 30° Baumé, and there concentrated to a gravity of from 80° to 90° Brix and brought to a temperature ranging from 120° F. to 160° F. depending on the type of crystals to be produced and the character and quality of impurities present. In this state the solution will be slightly supersaturated but insufficiently to produce crystallization to any extent at least. For the beta anhydrous the temperature should be at the upper end of the range; for the alpha hydrate at the lower end of the range, and for the alpha anhydride at an intermediate point, say from 120° to 130° F. The liquor is then seated with dry crystals or foots of the type of crystals to be produced, and in an amount varying with the character and amount of the impurities. Specifically for the alpha anhydrous one may seed at 130° F., with the liquor at a gravity of 84° Brix, assuming an initial solution of 94% purity and of average character with respect to the nature of the impurities, and use one-half of 1% of seed (dry basis) which will be ample. If the purity is as high as 97%, the seed may be merely a trace or no seed need be used. If the concentration and impurities are such as to give the solution a high viscosity the amount of seed should be increased. A liquor of 90% purity will grain at 140° F. and gravity of 88° to 89° Brix. New crystals of the proper kind will now begin to be formed provided first that crystallization is not prevented by the too rapid application of heat since relatively large amounts of heat are liberated by the crystallization itself; second, that the impurities have not raised the solubility of the particular dextrose form being produced to such a point that the solution is insufficiently supersaturated; and third, that the viscosity is not high enough to prevent free movement of seed and induced crystals through the liquor. If the supersaturation is inadequate or the viscosity too high, induction of new crystals can be aided by increasing the amount of seed introduced, or by promoting a greater circulation, through agitating with stirring devices or by introduction of air or water or other suitable means. Too high concentrations must be avoided in order that the supersaturation of the other dextrose forms in solution shall not be sufficient to bring about their crystallization. That is each crystallizable isomeride has a velocity of crystallization which will vary in accordance with temperature and other conditions. When the conditions favor crystallization of one isomeride the others, according to the phenomenon of tautomerism will change into the form which is crystallizing, so as to maintain equilibrium, unless supersaturation is so great that these other forms are forced to pass into the solid phase. When a sufficient body of crystals of the desired type has been induced, the boiling is continued rapidly enough to insure circulation but not more rapidly than the sugar coming out of solution will deposit on the body of crystals present. For this stage of the operation, in which the already formed crystals are built up to the size desired, preferably without the induction of new crystals, the following conditions should be maintained: the massecuite should be as fluent as possible so that the crystals will circulate and develop uniformly, otherwise they will grow together or may elongate abnormally. If the massecuite is too thick it may be diluted with water or with fresh solution or higher temperatures may be applied. The supersaturation should be only sufficient to cause the dextrose coming out of solution to deposit on the already formed crystals and should never be sufficient to bring about crystallization of the other dextrose forms. If supersaturation is too great the dextrose will be crowded out of the solution as stated, and not only in the form favored by the existing temperature and other conditions, in the other forms the rate of crystallization of which under these conditions is slower but is forced by the high supersaturation. However, crystallization of the beta anhydride in limited quantities is, for the reasons stated above, less objectionable than crystallization of the alpha hydrate. The boiling must proceed at a rate slow enough so that the other dextrose insomerides in solution may change into the alpha anhydrous instead of being crystallized. As the solid phase increases less regard may be had for these conditions, since as set forth in certain of the patents above mentioned, the presence of large quantities of solid phase of one type strongly induces crystallization in that type and inhibits crystallization in the other types even though other conditions governing in the absence of the solid phase may have just the opposite influence. Therefore as this stage of the operation proceeds the boiling may be more rapid and the concentrations of the mother liquor and the maintenance of temperatures specifically favorable to crystallization of the alpha anhydride may be in large measure disregarded. This means that the vacuum may be increased if not already at the maximum for which the pan is designed. Also as the solid phase increases liquors of lower purity than that of the liquor with which the pan was started may be introduced into the pan, although low purity is adverse to crystallization of the anhydride. At the end of the operation the gravity of the mother liquor will ordinarily be about 82° Brix.

It will be seen that the process is carried out in three stages: First, the concentration of the solution which may be carried on to about the point of supersaturation at any temperature or rate of boiling; second, the induction of crystals (preferably initiated by small amounts of seed crystals) which will require ordinarily from a few minutes to three quarters of an hour, and should not even under the most adverse circumstances require more than two or three hours; the amount of crystals to be induced depending on the size of the crystals desired in the finished batch; and third, the growth of the already formed crystals which operation should be completed ordinarily in from six to eight hours, and should not require in any case more than ten to twelve hours. The entire process including concentration and crystallization will therefore require from 36 to 48 hours.

If due to the amount or character of the impurities the magma at the third stage of the operation has a high viscosity, or if the rate of crystallization is for any reason slow, the massecuite having a mother liquor with a gravity of 82° Brix may be dropped into a crystallizer, at atmospheric pressure, as in the current process, and allowed to remain with agitation and proper control of temperature until crystallization has been carried as far as possible. That is the method commenced in accordance with the present invention is completed in accordance with the method of the prior patents above referred to.

Assuming that the graining has been done entirely in the pan, which is ordinarily feasible, after the crystals have been developed, as above described, to the proper size (a matter that can be readily controlled with this process) the massecuite is discharged from the vacuum pan and centrifuged to extract mother liquor. For the reasons above stated, the time of centrifuging is materially decreased, in comparison to the time required by the patented processes above referred to, and the amount of washing with water in the centrifugals is diminished to an even greater extent. The diminished washing not only saves time and decreases the loss of sugar in the wash water, but minimizes erosion of the crystals and thereby results in greater brilliancy and increased capacity for pouring or running freely. The increased purity of the product enhances its sweetness, which is important since dextrose is by its nature less sweet than sucrose. The anhydrous product thus produced will remain as dry in moist atmospheres as the partially dehydrated hydrate of Patent 1,559,176. The product will ordinarily consist to the extent of 90% or more of individual crystals in the strict sense of the term, the balance being twins and aggregates of the unitary type involving parallel growths, that is the growth of crystal forms on the flat surfaces of nucleus crystals. There will not be to any substantial extent, any interlacing or intergrowing of the crystals in groups giving granules of the so-called "cauliflower type." The mass may contain some beta anhydrous if the temperatures are high, but the presence of this type of crystals does not appear to effect the purgibility of the massecuite to any large extent.

*Production of beta anhydrous.*

The process is the same as that for production of the alpha anhydrous except that the temperature should be maintained at 140° F. or above, the mother liquor gravity should be about 86° Brix and the seed should be beta anhydrous. Mixtures of alpha and beta may be made, however, but the beta anhydrous is likely to be rather smaller and less perfectly developed, which is objectionable. If present in any large quantities, it makes the massecuite difficult to purge, although such massecuite can be purged much better than a mixture of anhydrous and hydrate crystals.

*Production of alpha hydrate.*

The conditions are the same as in the manufacture of the alpha anhydrous, except that the gravity of the solution should be less, preferably 79° to 80° Brix, the crystallizing temperature lower, that is, approximately 120° F. or less, and the seed alpha hydrate of normal form to the exclusion of pseudomorphs. The deposition of new sugar apparently has to proceed more slowly, otherwise the dextrose going out of solution tends to crystallize in imperfectly developed crystal forms.

While I have described certain preferred methods of producing the crystalline dextrose of my present invention in detail with respect to a starch converted liquor of a given purity, and have given directions, so far as it is possible to do so, for adapting the process to converted liquors having different characteristics, it will be recognized that it is not possible to make provision for every possible condition and contingency since the character of starch converted solutions, in respect particularly to the quantity and kind of its impurities, will differ in different factories or from day to day in the same factory. Because of this something must be left in carrying out the present method to the skill and discretion of the operator guided by the principles and directions which have been set forth, to the best of my present knowledge and experience, in the above discussion of the subject. I do not claim herein the process described as that is claimed in a co-pending application filed Oct. 24, 1927, Serial No. 228,488.

I claim:

1. Crystalline anhydrous dextrose in the form of granules the majority of which are individual crystals having smooth faces.

2. Crystalline anhydrous dextrose in the form of granules 90% or more of which are individual crystals.

3. A white substantially 100% pure crystalline dextrose, the majority of the granules of which are individual crystals.

4. Crystalline dextrose in the form of granules, 90% or more of which are individual crystals.

5. Crystalline anhydrous dextrose, white in color and substantially 100% pure consisting of granules 90% or more of which are individual crystals.

WILLIAM B. NEWKIRK.